United States Patent Office.

ANTOINE WARTER AND HENRY C. KOEGEL, OF NEWARK, NEW JERSEY.

TANNING PROCESS.

SPECIFICATION forming part of Letters Patent No. 380,708, dated April 10, 1888.

Application filed March 6, 1888. Serial No. 266,340. (No specimens.)

*To all whom it may concern:*

Be it known that we, ANTOINE WARTER and HENRY C. KOEGEL, citizens of the United States, residing at Newark, in the county of Essex and State of New Jersey, have invented certain new and useful Improvements in Tanning Leather; and we do declare the following to be a full, clear, and exact description of the invention, such as will enable others skilled in the art to which it appertains to make and use the same.

Our invention has relation to a process for tanning leather; and the object of the invention is to tan the skins effectually and rapidly, and at the same time render them permanently soft and flexible and capable of receiving a permanent and lasting color and a very high degree of finish, so as to improve their quality and lasting properties; and to these ends the novelty consists in the particular process hereinafter more fully described, and pointed out in the claim.

We first make a saturated solution of sulphate of aluminium in warm water and add caustic or sal soda until a precipitate ceases to be thrown down. This precipitate, (which is hydrated sesquioxide of aluminium or alumina hydrate,) is insoluble in water, and to remove any soluble matter that may have become mixed with it we carefully wash it in two or more waters, and finally siphon or decant the water, leaving the precipitate in the bottom of the vessel. We then make a solution of sulphuric acid and water until the solution has a density of about one and a half degrees (1½°) Baumé. The mixture of the acid and water raises the temperature of the solution, and it is allowed to stand until it regains its normal temperature. After this has been attained, we then add the above-mentioned precipitate, which is soluble in the acid solution, until the said solution will dissolve or take up no more of the said salt. The solution should now be a perfectly neutral one, owing to the acid combining with the neutral precipitate of aluminium; but if it should not be found neutral after testing with litmus paper we add sal-soda until it is neutral. The skins being first depilated and washed, are now placed in this solution and the whole agitated for about five (5) or six (6) hours. We now make a second solution of hydrated sesquioxide of chromium in sulphuric acid and water, as follows: In a suitable vessel sulphuric acid is added to the water until the solution attains a density of about one and a half degrees (1½°) Baumé, and after this has cooled we add enough of the sesquioxide of chromium to make a saturated solution, and if this solution should not be neutral we add sal-soda until it is neutral. The skins having been agitated in the aluminium solution for five or six hours, are now taken out, and after allowing the solution to drip off for a few minutes are immediately placed in the second or chromium solution and the whole agitated for about six or eight hours, and are then removed to the coloring or dye vat, where they are dyed and finished in the usual manner.

Part of the salts of aluminium and chromium with which the skins are impregnated form a base or mordant for the dye, rendering it permanent and lasting.

As this process relates entirely to a mineral tanning process, we lay no claim to the employment of vegetable substances in the case, as they are not used in the tanning process.

Having thus fully described our invention, what we claim as new and useful, and desire to secure by Letters Patent, is—

The process of tanning herein described, which consists in first depilating the skin, then subjecting it to a neutral solution formed by dissolving hydrated aluminium sesquioxide in an acid, and then treating the skin with a neutral solution of hydrated sesquioxide of chromium dissolved in an acid, as set forth.

In testimony whereof we affix our signatures in presence of two witnesses.

ANTOINE WARTER.
HENRY C. KOEGEL.

Witnesses:
J. WIDERMEYER,
J. L. LABIAUX.